United States Patent
Ben-Chanoch

(10) Patent No.: US 6,707,906 B1
(45) Date of Patent: Mar. 16, 2004

(54) OUTBOUND CALLING SYSTEM IN A CONTACT CENTER

(75) Inventor: Eyal Ben-Chanoch, Miami, FL (US)

(73) Assignee: Concerto Software, Inc., Westford, MA (US)

(*) Notice: Subject to any disclaimer, the term of this patent is extended or adjusted under 35 U.S.C. 154(b) by 0 days.

(21) Appl. No.: 09/524,656

(22) Filed: Mar. 13, 2000

(51) Int. Cl.$^7$ .......................... H04M 3/46; H04M 3/523
(52) U.S. Cl. ...................... 379/266.07; 379/210.01; 379/265.09; 379/266.08; 379/900; 379/904; 379/908; 379/909
(58) Field of Search .................. 379/265.01, 265.02, 379/265.09, 265.1, 266.01, 266.07, 266.08, 210.01, 900, 904, 908, 909

(56) References Cited

U.S. PATENT DOCUMENTS

| | | |
|---|---|---|
| 3,333,271 A | 7/1967 | Robinson et al. ............ 343/113 |
| 4,066,847 A | 1/1978 | Giordano ...................... 179/99 |
| 4,286,118 A | 8/1981 | Mehaffey et al. .......... 179/18 D |
| 4,356,348 A | 10/1982 | Smith ...................... 179/1 MN |
| 4,392,129 A | 7/1983 | Mehaffey et al. ............ 340/765 |
| 4,408,100 A | 10/1983 | Pritz et al. ................. 179/27 D |
| 4,477,698 A | 10/1984 | Szlam et al. ............ 179/90 BD |
| 4,494,229 A | 1/1985 | Jolissaint ...................... 370/58 |
| 4,510,351 A | 4/1985 | Costello et al. ............ 179/27 D |
| 4,540,855 A | 9/1985 | Szlam et al. .............. 179/84 R |
| 4,593,273 A | 6/1986 | Narcisse ...................... 340/539 |
| 4,599,493 A | 7/1986 | Cave ....................... 179/18 FH |
| 4,600,814 A | 7/1986 | Cunniff et al. .......... 179/18 BC |
| 4,677,663 A | 6/1987 | Szlam ........................ 379/211 |
| 4,692,858 A | 9/1987 | Redford et al. ............. 364/200 |
| 4,694,483 A | 9/1987 | Cheung ........................ 379/34 |
| 4,720,853 A | 1/1988 | Szlam ........................ 379/211 |
| 4,742,537 A | 5/1988 | Jesurum ..................... 379/351 |
| 4,742,538 A | 5/1988 | Szlam ........................ 379/361 |
| 4,742,539 A | 5/1988 | Szlam ........................ 379/377 |

(List continued on next page.)

FOREIGN PATENT DOCUMENTS

EP 0855826 7/1998 ............ H04M/3/50

OTHER PUBLICATIONS

M2 Presswire, 3COM: Cell IT launches breakthrough multimedia call center solution based on high speed 3Com systems; Mar. 4, 1998; 1–3 webpages; Coventry.

AT & T Technology; In The Forefront With Integrated Call Centers; Winter 1992; 1–7 webpages; New York.

Telemarketing & Call Center Solutions; How a Travel–Industry Call Center Excels; Sep. 1997; 1–2 webpages; Norwalk.

*Primary Examiner*—Harry S. Hong
(74) *Attorney, Agent, or Firm*—Bourque & Associates, P.A.

(57) ABSTRACT

An integrated contact center capable of generating outbound calls in a plurality forms including at least one instant online communication form for instantly communicating with a customer when he is online. A priority scheme or communication forms is preset for each customer so that the contact center may try the outbound calls according to the scheme until one succeeds. The contact center detects whether the target customer is online or not before an online communication form is tried.

21 Claims, 1 Drawing Sheet

U.S. PATENT DOCUMENTS

| | | | |
|---|---|---|---|
| 4,757,267 A | 7/1988 | Riskin | 379/113 |
| 4,782,463 A | 11/1988 | Sanders | 364/900 |
| 4,782,510 A | 11/1988 | Szlam | 379/88 |
| 4,792,968 A | 12/1988 | Katz | 379/92 |
| 4,797,911 A | 1/1989 | Szlam et al. | 379/67 |
| 4,811,240 A | 3/1989 | Ballou et al. | 364/518 |
| 4,829,563 A | 5/1989 | Crockett et al. | 379/309 |
| 4,858,120 A | 8/1989 | Samuelson | 364/401 |
| 4,866,638 A | 9/1989 | Cosentino et al. | 364/521 |
| 4,881,261 A | 11/1989 | Oliphant et al. | 379/215 |
| 4,894,857 A | 1/1990 | Szlam et al. | 379/67 |
| 4,896,345 A | 1/1990 | Thorne | 379/67 |
| 4,933,964 A | 6/1990 | Girgis | 379/67 |
| 4,939,771 A | 7/1990 | Brown et al. | 379/67 |
| 4,939,773 A | 7/1990 | Katz | 379/204 |
| 4,988,209 A | 1/1991 | Davidson et al. | 370/58 |
| 5,021,976 A | 6/1991 | Wexelblat et al. | 364/521 |
| 5,041,992 A | 8/1991 | Cunningham et al. | 364/518 |
| 5,062,103 A | 10/1991 | Davidson et al. | 370/58.1 |
| 5,070,525 A | 12/1991 | Szlam et al. | 379/196 |
| 5,115,501 A | 5/1992 | Kerr | 395/600 |
| 5,119,072 A | 6/1992 | Hemingway | 340/573 |
| 5,119,475 A | 6/1992 | Smith et al. | 395/156 |
| 5,121,477 A | 6/1992 | Koopmans et al. | 395/156 |
| 5,175,761 A | 12/1992 | Khalid et al. | 379/89 |
| 5,179,657 A | 1/1993 | Dykstal et al. | 395/161 |
| 5,179,700 A | 1/1993 | Aihara et al. | 395/650 |
| 5,181,236 A | 1/1993 | LaVallee et al. | 379/67 |
| 5,206,903 A | 4/1993 | Kohler et al. | 379/309 |
| 5,214,688 A | 5/1993 | Szlam et al. | 379/67 |
| 5,276,731 A | 1/1994 | Arbel et al. | 379/88 |
| 5,309,505 A | 5/1994 | Szlam et al. | 379/88 |
| 5,309,513 A | 5/1994 | Rose | 379/265 |
| 5,335,269 A | 8/1994 | Steinlicht | 379/266 |
| 5,345,589 A | 9/1994 | King et al. | 395/650 |
| 5,357,254 A | 10/1994 | Kah | 342/42 |
| 5,386,412 A | 1/1995 | Park et al. | 370/53 |
| 5,428,827 A | 6/1995 | Kasser | 455/161.3 |
| 5,430,792 A | 7/1995 | Jesurum et al. | 379/67 |
| 5,440,616 A | 8/1995 | Harrington et al. | 379/88 |
| 5,490,211 A | 2/1996 | Adams et al. | 379/265 |
| 5,500,891 A | 3/1996 | Harrington et al. | 379/650 |
| 5,511,112 A | 4/1996 | Szlam | 379/88 |
| 5,511,117 A | 4/1996 | Zazzera | 379/265 |
| 5,519,773 A | 5/1996 | Dumas et al. | 379/265 |
| 5,533,109 A | 7/1996 | Baker | 379/201 |
| 5,535,270 A | 7/1996 | Doremus et al. | 379/266 |
| 5,546,456 A | 8/1996 | Vilsoet et al. | 379/265 |
| 5,553,133 A | 9/1996 | Perkins | 379/265 |
| 5,568,544 A | 10/1996 | Keeler et al. | 379/273 |
| 5,579,368 A | 11/1996 | Berkum | 379/15 |
| 5,581,602 A | 12/1996 | Szlam et al. | 379/67 |
| 5,586,178 A | 12/1996 | Koenig et al. | 379/265 |
| 5,588,045 A | 12/1996 | Locke | 379/67 |
| 5,594,781 A | 1/1997 | Kozdon et al. | 379/60 |
| 5,594,791 A | 1/1997 | Szlam et al. | 379/265 |
| 5,619,557 A | 4/1997 | Berkum | 379/88 |
| 5,623,540 A | 4/1997 | Morrison et al. | 379/115 |
| 5,675,637 A | 10/1997 | Szlam et al. | 379/142 |
| 5,689,240 A | 11/1997 | Traxler | 340/573 |
| 5,696,818 A | 12/1997 | Doremus et al. | 379/265 |
| 5,714,932 A | 2/1998 | Castellon et al. | 340/539 |
| 5,715,307 A | 2/1998 | Zazzera | 379/265 |
| 5,722,059 A | 2/1998 | Campana | 455/226.2 |
| 5,722,064 A | 2/1998 | Campana | 455/351 |
| 5,729,600 A | 3/1998 | Blahal | 379/265 |
| 5,742,233 A | 4/1998 | Hoffman et al. | 340/573 |
| 5,815,565 A | 9/1998 | Doremus et al. | 379/265 |
| 5,825,283 A | 10/1998 | Camhl | 340/438 |
| 5,825,869 A | 10/1998 | Brooks et al. | 379/265 |
| 5,828,731 A | 10/1998 | Szlam | 379/88 |
| 5,832,059 A | 11/1998 | Aldred et al. | 379/34 |
| 5,832,070 A | 11/1998 | Bloom et al. | 379/265 |
| 5,857,014 A | 1/1999 | Sumner et al. | 379/93.02 |
| 5,864,615 A | 1/1999 | Dezonno | 379/265 |
| 5,940,494 A | 8/1999 | Rafacz et al. | 379/265 |
| 5,963,635 A | 10/1999 | Szlam et al. | 379/309 |
| RE36,416 E | 11/1999 | Szlam et al. | 379/88.09 |
| 5,991,394 A | 11/1999 | Dezonno et al. | 379/265 |
| 6,044,146 A | 3/2000 | Gisby et al. | 379/265 |
| 6,044,355 A | 3/2000 | Crockett et al. | 705/8 |
| 6,118,763 A | 9/2000 | Trumbull | 370/231 |
| 6,134,530 A | 10/2000 | Bunting et al. | 705/7 |
| 6,157,655 A | 12/2000 | Shtivelman | 370/412 |
| 6,269,153 B1 | 7/2001 | Carpenter | 379/88.02 |
| 6,272,347 B1 | 8/2001 | Griffith et al. | 455/445 |
| 6,314,089 B1 | 11/2001 | Szlam et al. | 370/270 |
| 6,359,892 B1 | 3/2002 | Szlam | 370/401 |
| 6,359,982 B1 | 3/2002 | Foster et al. | 379/266.06 |
| 6,362,838 B1 | 3/2002 | Szlam et al. | 345/762 |
| 6,493,447 B1 * | 12/2002 | Goss et al. | 379/265.09 |
| 2002/0047859 A1 | 4/2002 | Szlam et al. | 345/705 |
| 2002/0067822 A1 | 6/2002 | Cohen et al. | 379/265.12 |
| 2002/0143878 A1 | 10/2002 | Birnbaum et al. | 709/205 |
| 2002/0145624 A1 | 10/2002 | Szlam et al. | 345/738 |
| 2002/0161896 A1 | 10/2002 | Wen et al. | 709/227 |

\* cited by examiner

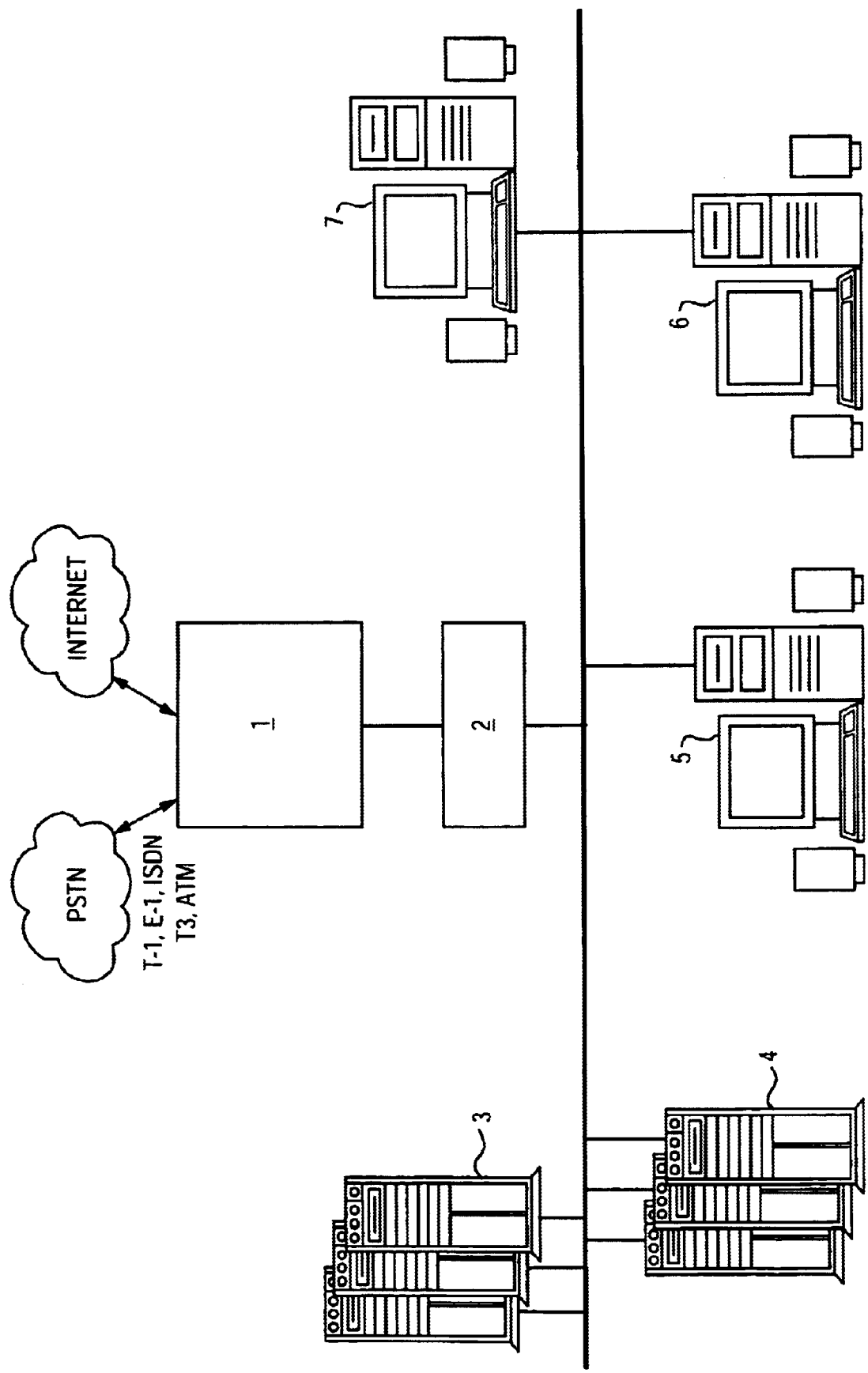

OUTBOUND CALLING SYSTEM IN A
CONTACT CENTER

TECHNICAL FIELD

This invention relates to call centers, and in particular, to an inbound/outbound calling system and method used in an integrated contact center.

BACKGROUND OF THE INVENTION

Most large service oriented companies have a call center for communicating with customers to sell services or products as well as to provide customer services. Customers may call, usually by dialing a toll-free number, into the call center to talk with the agents or representatives. In addition to the inbound calls initiated by the customers, the agents or representatives also initiate outbound calls for selling their products to potential customers, for calling back a customer who called earlier or to alert the customer of any required issue. Traditional forms of the calls, either inbound calls or outbound calls, usually include phone calls and facsimiles.

New communications techniques are continuously being developed following the boom of the Internet. Internet telephony, video conference and web chat are becoming more and more feasible and practical methods for people to communicate with each other because of its unique features and lower costs. There is a trend to evolve call centers into integrated contact centers that can communicate with customers not only by traditional methods, but also by internet-based newly developed communications techniques. However, there exists only the crudest methods to allow interaction between customers and company agents over the Internet. A customer may engage in a web chat, for example. There is however, no known technique of integrating an inbound/outbound call center with Internet media to produce a comprehensive contact center.

SUMMARY OF THE INVENTION

An object of the invention is to provide a technique with which a contact center can process and generate inbound/outbound contacts in a variety of forms that integrate Internet and telephony media.

The contact center of the invention is provided with means for generating outbound contacts in a plurality forms including at least one instant online communication form that is capable of instantly communicating with a customer when he or she is online. The online form may include instant web chat, internet audio and/or video telephony, etc.

A priority scheme of the call forms may be preset for each customer and an outbound contact will be tried in one form after another according to this priority scheme until one succeeds.

In a preferred embodiment, means is provided for detecting whether the targeted customer is online or not before the contact center tries a form of instant online communication method.

In one embodiment, an Internet address is used by the contact center to initiate an outbound contact over the Internet. The address of the contacted party is sent to an agent, and the online contact is established.

The above and further features and advantages of the present invention will be further explained with the preferred embodiment.

BRIEF DESCRIPTION OF THE DRAWINGS

FIG. 1 is a typical arrangement of an integrated contact center.

DETAILED DESCRIPTION OF THE PREFERRED EMBODIMENT

A typical state-of-the-art contact center of today is shown in FIG. 1 which includes a Gateway 1 connected with both PSTN and Internet for communicating with customers in a form of either analogue data or packet data. Through an ATM or Ethernet Switch 2, the Gateway 1 is also connected with other parts of the contact center including Applications Servers 3, Database Servers 4, Blended Agent 5, Supervisor 6 and Unified System Administration and Management 7. Blended Agent 5 is a group of professional agents or representatives for communicating with customers through their respective terminals. Selected activities are under monitoring by the Supervisor 6. The CCPRO system, available from the assignee of the present invention, implements most of the foregoing.

Equipped with proper hardware and software, an agent in the contact center shown in FIG. 1 can answer an inbound call from a customer in different forms, either traditional one such as telephone and facsimile, or a newly developed telecommunications techniques on packet switched data network such as email, web chat and internet telephony. The conversation between the agent and the customer may be accomplished synchronously such as by telephone or Internet telephony, or asynchronously such as by email or fax.

In the present invention, the contact center can also initiate an outbound contact to a customer who is online. In particular, the contact center is provided with means for generating an outbound call to customer in different forms in which at least one kind of instant online communication form is included. This instant online communication form may include web chat, PC-to-PC Internet telephony, video conference, etc.

In preferred embodiment, a priority scheme in the call forms is preset for each customer and the contact center, while being desired to generate an outbound call to a customer, will try one form after another according to the preset priority scheme until one succeeds.

The priority scheme may be preset following the commands from the customer received over the Internet. For example, while requesting a call back, the customer may specify what form of call is preferred and shall be tried first. The customer may present his own priority scheme over the Internet, advising the contact center in which order he/she wishes to be contacted. The customer may determine at what times or days he wishes to be contacted in what orders, and may specify same via a password. The customer may complete a table with columns for different times or days, indicating a different priority for each. Thus, a graphical user interface (GUI) will be provided. From the GUI, the user may "click" on various media types, drag, and then drop them in order.

The priority scheme may also be preset by the contact center on its own initiative. For example, for saving cost, the contact center may try packet data communications methods first, e.g., email or web text chat.

An important feature of the present invention is in that instant online communications techniques are incorporated in the contact center for generating outbound contacts to its customers. This is advantageous in many aspects, especially when the targeted customer is online, which is now often the situation.

Before the contact center tries an instant online communication form, it may detect whether the targeted customer is online or not. There are known a plurality of techniques and services providing monitoring of whether a particular user is online or not (such as AOL ICQ and Microsoft Instant Messenger, etc.). Usually the customer is required to have a piece of small software running on its computer so that others can find he is online. If the targeted customer is found not online, the contact center will skip trying the online communications forms, and try telephone communications.

If the targeted customer is found online, the contact center may, according to the preset priority scheme, send a message to the customer informing him that a conversation is requested. The message will be shown to the customer immediately and the customer may accept the request or deny it. If the targeted customer accepts the request, a contact between the customer and the contact center is thus successfully established, and then the contact may be transferred to an available agent to begin the "conversation". The agent will be sent a message indicating the customer e-mail address and/or name. The transfer could be dependent on contact type. For example some agents could get chat contacts but not voice (perhaps they have a poor speaking voice); others could get voice but not chat (poor typing skills), etc.

Alternatively, the customer may request that the contact be changed to a different media or time. (e.g. Please contact me by telephone instead). Thus, if the customer sees the message from the contact center on the screen, he may respond by overriding the chosen form of communication and requesting a different form of contact. This would be particularly useful if the user is online while traveling. He could respond with a telephone number where he can be reached which the contact center would utilize to recontact the user.

Generating outbound calls in an instant online communications form brings numerous advantages to the contact center. It cannot only easily locate customers, many of whom are often online now, but also save substantial expenditures in long distance calls and agent time.

Furthermore, the intrinsic advantageous features of instant online communications forms are also incorporated in the outbound calls. For example, the web text chat can exchange more clear and precise contents between an agent and a customer, especially where important facts such as numerals and names that requires confirmative recognition. Web text chat is also very helpful to customers who are not comfortable to communicate with the contact center using voice because of a deficiency in speaking or listening, e.g., a foreigner visiting the United States. With the globalization of internet, this will become more common. Besides, asynchronous interactions like email and slightly asynchronous interactions like chat are more efficient for agent productivity than synchronous communication like voice because agents can serve multiple interactions simultaneously.

Different from text chat, internet telephony has it own advantage in providing voice conversation and even visual presentation.

While the above describes the preferred embodiment in the invention, various modifications or additions would be apparent to those of skill in the art. Such modifications are intended to be covered by the following claims.

What is claimed:

1. A method of generating outbound contacts from a contact center to a customer, comprising the steps of:

presetting for a customer a priority scheme that in which order shall a plurality of forms of outbound contact be tried, said plurality forms including at least one generally instant online communication form; and generating an outbound contact to said customer by trying one form after another according to said priority scheme preset for said customer until one form succeeds.

2. The method of claim 1 wherein said step or presetting priority scheme comprising a step of receiving a command from said customer in which said priority scheme is requested.

3. The method of claim 2 wherein said command is provided in an inbound contact from said customer.

4. The method of claim 3 wherein said inbound contact is in an instant online communication form.

5. The method of claim 4 wherein a call back is requested in said inbound contact.

6. The method of claim 1 wherein said priority scheme for said customer varies in different time periods.

7. The method of claim 1 further including a step of transferring an outbound contact to an available agent after said outbound contact is successfully generated.

8. The method of claim 1 wherein said instant online communication form includes web chat, audio internet telephony, video internet telephony and their combination.

9. The method of claim 1 further including a step of, before trying said generally instant online communication form, detecting whether said customer is online or not.

10. The method of claim 9 further including a step of, upon finding said customer being online, sending an instant message to inform said customer that an contact is being requested.

11. The method of claim 9 wherein said instant online communication form will not be tried if by said step of detecting said targeted customer is found not online.

12. A contact center for communicating with its customers comprising:

means for presetting, for one or more specified customers, an outbound contact priority scheme that controls in which order a plurality of forms of outbound contact shall be tried; and means for generating outbound contact to the customer in the plurality forms of contact, wherein said plurality forms include at least one generally instant online communication form that is capable of generally instantly communicating with said customer when said customer is online.

13. A contact center for communicating with its customers comprising:

means for generating an outbound contact to a customer in a plurality of forms of contact, wherein said plurality of forms of contact include at least one generrlly instant online communication form that is capable of generally instantly communicating with said customer when said customer is online; and means for keeping a priority scheme of forms of contact for said customer according to which said forms of contact shall be tried one after another in a preset time period until one succeeds.

14. The contact center of claim 13 wherein said priority scheme is preset according to a command from said customer.

15. The contact center of claim 14 wherein said command is given in a call back request from said customer.

16. The contact center of claim 12 wherein said instant online communication form includes web chat, audio internet telephony, video internet telephony and their combination.

17. The contact center of claim 12 further comprising means for detecting whether said particular customer is online or not.

18. The contact center of claim 12 further comprising means for instantly informing said customer when he is online that an instant online communication is requested.

19. The contact center of claim 12 wherein said plurality forms further include phone call, email and facsimile.

20. The method of claim 1 wherein said customer may override said priority scheme after being successfully contacted with an outbound contact.

21. The method of claim 7 further comprising transferring an e-mail address of said customer to an agent after said contact is complete.

\* \* \* \* \*